United States Patent
Kajioka et al.

(10) Patent No.: US 11,428,847 B2
(45) Date of Patent: Aug. 30, 2022

(54) TRANSPARENT PRODUCT AND METHOD FOR PRODUCING TRANSPARENT PRODUCT

(71) Applicant: NIPPON ELECTRIC GLASS CO., LTD., Shiga (JP)

(72) Inventors: Toshiyuki Kajioka, Otsu (JP); Koji Ikegami, Otsu (JP)

(73) Assignee: Nippon Electric Glass Co., Ltd., Shiga (JP)

( * ) Notice: Subject to any disclaimer, the term of this patent is extended or adjusted under 35 U.S.C. 154(b) by 255 days.

(21) Appl. No.: 16/613,074

(22) PCT Filed: May 15, 2018

(86) PCT No.: PCT/JP2018/018630
§ 371 (c)(1),
(2) Date: Nov. 12, 2019

(87) PCT Pub. No.: WO2018/212146
PCT Pub. Date: Nov. 22, 2018

(65) Prior Publication Data
US 2020/0191999 A1   Jun. 18, 2020

(30) Foreign Application Priority Data

May 15, 2017   (JP) .............................. JP2017-096636

(51) Int. Cl.
*G02B 1/11* (2015.01)
*B05D 1/02* (2006.01)
*B05D 5/06* (2006.01)

(52) U.S. Cl.
CPC ................. *G02B 1/11* (2013.01); *B05D 1/02* (2013.01); *B05D 5/061* (2013.01)

(58) Field of Classification Search
None
See application file for complete search history.

(56) References Cited

U.S. PATENT DOCUMENTS

2012/0218640 A1   8/2012   Gollier et al.
2016/0326047 A1*  11/2016  Mototani ................ C03C 17/30

FOREIGN PATENT DOCUMENTS

| CN | 104834034 A | 8/2015 |
| CN | 105319616 A | 2/2016 |

(Continued)

OTHER PUBLICATIONS

Chinese Office Action dated Apr. 22, 2021, Chinese Patent Application No. 201880031516.9.
Klapetek et al., "Gwyddion User Guide", 2012, 11 pages.

*Primary Examiner* — Michael P. Rodriguez
(74) *Attorney, Agent, or Firm* — Proskauer Rose LLP

(57) ABSTRACT

The present invention addresses the problem of providing a transparent product which has an anti-glare surface having a surface shape which makes it possible to lower the haze value thereof and to obtain an excellent glare-suppressing effect. The transparent product has a transparent substrate 11 equipped with an anti-glare surface. The surface shape of the anti-glare surface is shaped in a manner such that the ratio $(r_0/r_{0.2})$ of the autocorrelation length $(r_0)$, which is the minimum value of the distance r at which the autocorrelation function g(r) represented by formula (1) is 0, to the autocorrelation length $(r_{0.2})$, which is the minimum value of the distance r at which the autocorrelation function g(r) is 0.2, is 2 or higher. The autocorrelation function g(r) is obtained by converting the autocorrelation function $g(t_x, t_y)$ obtained (Continued)

by normalizing the surface shape z(x, y) of the antiglare surface to polar coordinates ($t_x = r \cos \Phi$, $t_y = r \sin \Phi$), and averaging the angle direction.

$$g(r) = \frac{1}{2\pi} \int_0^{2\pi} d\phi \cdot g(r\cos\phi, r\sin\phi) \tag{1}$$

5 Claims, 5 Drawing Sheets

(56) References Cited

FOREIGN PATENT DOCUMENTS

| | | | |
|---|---|---|---|
| JP | 2010-064932 | A | 3/2010 |
| JP | 2014-513029 | A | 5/2014 |
| JP | 6013378 | B2 | 9/2016 |
| WO | 2016069113 | A1 | 5/2016 |

\* cited by examiner

TRANSPARENT PRODUCT AND METHOD FOR PRODUCING TRANSPARENT PRODUCT

TECHNICAL FIELD

The present invention relates to a transparent article including an antiglare surface and a method for manufacturing the transparent article.

BACKGROUND ART

In order to improve the visual recognition of a display device, it has been suggested that the surface of a transparent article located on a display surface of the display device be an antiglare surface that has an antiglare effect. The antiglare effect of the antiglare surface is obtained based on the shape of unevenness on the antiglare surface. Thus, the function of the antiglare surface can be controlled by adjusting the shape of unevenness on the antiglare surface. For example, in the disclosure of Patent Document 1, sparkle (glare resulting from a sparkle effect) can be reduced by setting a surface roughness Sq (root mean square (RMS) surface roughness) of the antiglare surface formed on the surface of a transparent glass panel in a certain range.

PRIOR ART LITERATURE

Patent Literature

Patent Document 1: Japanese Patent No. 6013378

SUMMARY OF THE INVENTION

Problem to be Solved by the Invention

A transparent article including the antiglare surface has an antireflection effect that uses the shape of the antiglare surface to reflect and diffuse light from outside of the display device. However, this scatters the light transmitted from the inside of the display device. Thus, there is a tendency of the resolution of the display device being lowered.

The present invention is made in view of such circumstances, and it is an object of the present invention to provide a transparent article that obtains a superior antireflection effect and maintain the resolution of an image viewed through the transparent article, such as an image that is displayed on a display device, and a method for manufacturing the transparent article.

Means for Solving the Problem

A transparent article that solves the above problem comprises a transparent base material having an antiglare surface. The antiglare surface has a surface shape such that a ratio ($r_0/r_{0.2}$) of autocorrelation length ($r_{0.2}$), which is the minimum value of distance r at which autocorrelation function g(r) represented by equation (1) is 0.2, to autocorrelation length ($r_0$), which is the minimum value of distance r at which the autocorrelation function g(r) is 0, is greater than or equal to 2.

$$g(r) = \frac{1}{2\pi} \int_0^{2\pi} d\phi \cdot g(r\cos\phi, r\sin\phi) \qquad (1)$$

The autocorrelation function g(r) is obtained by converting autocorrelation function $g(t_x, t_y)$, which is normalized to a surface shape z(x, y) of the antiglare surface, into polar coordinates ($t_x = r \cos \Phi$, $t_y = r \sin \Phi$) and performing averaging in an angular direction. The surface shape z(x, y) is a surface shape expressed when coordinates in a direction parallel to the antiglare surface are orthogonal coordinates (x, y) and the height of the antiglare surface in a direction orthogonal to the antiglare surface is "z". The autocorrelation function $g(t_x, t_y)$ is represented by equation (2). "A" in equations (2) and (3) is an area of a subject range of the antiglare surface. The origin of the surface shape z(x, y) is a position that satisfies equation (3).

$$g(t_x, t_y) = G(t_x, t_y)/G(0, 0) \qquad (2)$$
$$G(t_x, t_y) = \frac{1}{A} \int\int_A dxdy \cdot z(x, y)z(x - t_x, y - t_y)$$

$$\int\int_A dxdy \cdot z(x, y) = 0 \qquad (3)$$

In the above transparent article, it is preferred that the antiglare surface has a surface shape such that the autocorrelation length ($r_{0.2}$) is 6 μm or less.

In the above transparent article, it is preferred that the antiglare surface has a surface shape such that when distance r, of which the local minimum value is first obtained in a range greater than the autocorrelation length ($r_{0.2}$), is $r_{min}$ in a graph illustrating changes in absolute value (|dg/dr|) of a derivative of the autocorrelation function g(r), the autocorrelation function $g(r_{min})$ is a positive value.

Further, a method for manufacturing the transparent article that solves the above problem includes an antiglare surface forming step that forms an antiglare layer including the antiglare surface by applying a coating agent on a surface of the transparent base material through a spray coating process. In the antiglare surface forming step, a twin-fluid nozzle with a diameter of 0.5 mm or less is used and a surface temperature of the transparent base material is set to 30° C. or higher.

Effect of the Invention

The present invention succeeds in obtaining a superior antireflection effect of the antiglare surface while maintaining the resolution.

MODE FOR CARRYING OUT THE INVENTION

One embodiment of the present invention will now be described.

Figure 1:
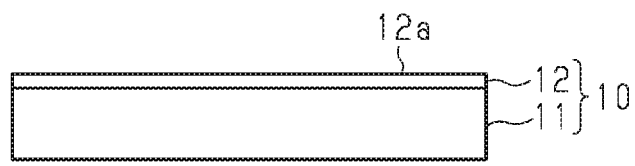
FIG. 1 is an explanatory diagram of a transparent article.

As shown in FIG. 1, a transparent article 10 includes a transparent base material 11 that is a light-transmissive panel. The transparent base material 11 has a thickness of, for example, 0.1 to 5 mm. Examples of the material for the transparent base material 11 include glass and resin. The material for the transparent base material 11 is preferably glass, and the glass may be known glass such as alkali-free glass, alumino-silicate glass, or soda lime glass. Further, reinforced glass such as chemically reinforced glass, or crystallized glass such as LAS-type crystallized glass may be used. Among these glasses, alumino-silicate glass is preferably used. Particularly, the use of chemically reinforced glass containing 50% to 80% by mass of $SiO_2$, 5% to 25% by mass of $Al_2O_3$, 0% to 15% by mass of $B_2O_3$, 1% to 20% by mass of $Na_2O$, and 0% to 10% by mass of $K_2O$ is preferred. Examples of the resin include polymethylmethacrylate, polycarbonate, and epoxy resin.

One main surface of the transparent base material 11 is provided with an antiglare layer 12 that includes an antiglare surface 12a. The antiglare surface 12a has an uneven structure that scatters light. Preferably, the antiglare surface 12a has a surface roughness Sa (arithmetic mean surface height) of, for example, 0.03 to 0.5 min. The surface roughness Sq is measured in accordance with ISO 25178.

The antiglare layer 12 is formed, for example, from a matrix containing an inorganic oxide, such as $SiO_2$, $Al_2O_3$, $ZrO_2$, or $TiO_2$. An example of the uneven structure of the antiglare surface 12a is an insular uneven structure that includes insular bulged portions and flat portions arranged therebetween. Preferably, the antiglare layer 12 is formed only from an inorganic oxide or inorganic oxides or does not include an organic compound.

The antiglare layer 12 may be formed by applying a coating agent to the surface of the transparent base material 11 and heating the coating agent (antiglare surface forming step). The coating agent includes, for example, a matrix precursor and a liquid medium that dissolves the matrix precursor. Examples of the matrix precursor in the coating agent include an inorganic precursor, such as a silica precursor, an alumina precursor, a zirconia precursor, or a titania precursor. A silica precursor is preferred because it decreases the refractive index of the antiglare layer 12 and facilitates control of the reactivity.

Examples of the silica precursor include a silane compound including a hydrocarbon group bound to a silicon atom and a hydrolyzable group, a hydrolytic condensate of a silane compound, and a silazane compound. It is preferred to include at least one of or both of a silane compound and a hydrolytic condensate thereof for adequately limiting formation of a crack in the antiglare layer 12 even when the antiglare layer 12 is formed to be relatively thick.

The silane compound includes a hydrocarbon group bound to a silicon atom and a hydrolyzable group. The hydrocarbon group may include a group selected from or a combination of two or more of —O—, —S—, —CO—, and —NR'— (R' is a hydrogen atom or univalent hydrocarbon group) between carbon atoms.

The hydrocarbon group may be a univalent hydrocarbon group bound to one silicon atom or a divalent hydrocarbon group bound to two silicon atoms. Examples of the univalent hydrocarbon group include an alkyl group, an alkenyl group, and an aryl group. Examples of the divalent hydrocarbon group include an alkylene group, an alkenylene group, and an arylene group.

Examples of the hydrolyzable group include an alkoxy group, an acyloxy group, a ketoxime group, an alkenyloxy group, an amino group, an aminooxy group, an amido group, an isocyanate group, and a halogen atom. An alkoxy group, an isocyanate group, and a halogen atom (particularly, chlorine atom) are preferred since they are well-balanced in terms of stabilizing the silane compound and facilitating hydrolysis of the silane compound. The alkoxy group is preferably an alkoxy group with 1 to 3 carbons, and further preferably a methoxy group or an ethoxy group.

Examples of the silane compound include an alkoxysilane (such as tetramethoxysilane, tetraethoxysilane, or tetraisopropoxysilane), an alkoxysilane including an alkyl group (such as methyltrimethoxysilane or ethyltrimethoxysilane), an alkoxysilane including a vinyl group (such as vinyltrimethoxysilane or vinyltriethoxysilane), an alkoxysilane including an epoxy group (such as 2-(3, 4-epoxycyclohexyl) ethyltrimethoxysilane, 3-glycidoxypropyltrimethoxysilane, 3-glycidoxypropylmethyldiethoxysilane, or 3-glycidoxypropyltriethoxysilane), and an alkoxysilane including an acryloyloxy group (such as 3-acryloyloxypropyltrimethoxysilane). Among these silane compounds, the use of at least one of or both of an alkoxysilane and a hydrolytic condensate thereof is preferred, and the use of a hydrolytic condensate of an alkoxysilane is further preferred.

The silazane compound is a compound including bonded silicon and nitrogen (—SiN—). The silazane compound may be a low-molecular compound or a high-molecular compound (polymer having predetermined repeating unit). Examples of a low-molecular silazane compound include hexamethyldisilazane, hexaphenyldisilazane, dimethylaminotrimethylsilane, trisilazane, cyclotrisilazane, and 1, 1, 3, 3, 5, 5-hexamethylcyclotrisilazane.

Examples of the alumina precursor include an aluminum alkoxide, a hydrolytic condensate thereof, a water-soluble aluminum salt, and an aluminum chelate. Examples of the zirconia precursor include a zirconium alkoxide and a hydrolytic condensate thereof. Examples of the titania precursor include a titanium alkoxide and a hydrolytic condensate thereof.

The liquid medium included in the coating agent is a solvent selected in accordance with a type of the matrix precursor and dissolves the matrix precursor. Examples of the liquid medium include water, an alcohol, a ketone, an ether, a cellosolve, an ester, a glycol ether, a nitrogen-containing compound, and a sulfur-containing compound.

Examples of the alcohol include methanol, ethanol, isopropanol, butanol, and diacetone alcohol. Examples of the ketone include acetone, methyl ethyl ketone, and methyl isobutyl ketone. Examples of the ether include tetrahydrofuran and 1, 4-dioxane. Examples of the cellosolve include methyl cellosolve and ethyl cellosolve. Examples of the ester include methyl acetate and ethyl acetate. Examples of the glycol ether include ethylene glycol monoalkyl ether. Examples of the nitrogen-containing compound include N,N-dimethylacetamide, N,N-dimethylformamide, and N-methylpyrrolidone. Examples of the sulfur-containing compound include dimethyl sulfoxide. The liquid medium may be of a single type or a combination of two or more types.

The liquid medium preferably contains water, or in other words, is preferably water, or a liquid mixture of water and another liquid medium. The other liquid medium is preferably an alcohol, and particularly preferably, methanol, ethanol, isopropyl alcohol, or butanol.

Further, the coating agent may include an acid catalyst that prompts hydrolysis and condensation of the matrix precursor. The acid catalyst is a component that prompts hydrolysis and condensation of the matrix precursor to form the antiglare layer 12 promptly. The acid catalyst may be added for hydrolysis and condensation of a raw material (such as alkoxysilane) during the preparation of a solution of the matrix precursor before the preparation of the coating agent, or, may be added after the preparation of essential components. Examples of the acid catalyst include an inorganic acid (such as nitric acid, sulfuric acid, or hydrochloric acid) and an organic acid (such as formic acid, oxalic acid, acetic acid, monochloroacetic acid, dichloroacetic acid, or trichloroacetic acid).

Examples of a method for applying the coating agent include a known wet coating process (such as spray coating, spin coating, dip coating, dye coating, curtain coating, screen coating, inkjet coating, flow coating, gravure coating, bar coating, flexo coating, slit coating, or roll coating). The spray coating facilitates the formation of the uneven structure and is thus the preferred coating process.

Examples of a nozzle used for the spray coating include a twin-fluid nozzle and a single fluid nozzle. A droplet of the coating agent discharged from the nozzle normally has a diameter of 0.1 to 100 µm or preferably 1 to 50 µm. When the diameter of the droplet is 0.1 min or greater, an uneven structure having a suitable antiglare effect is promptly formed. When the diameter of the droplet is 100 µm or less, the formation of an uneven structure having a suitable antiglare effect is facilitated. The diameter of a droplet of the coating agent can be adjusted, for example, by changing the type of the nozzle, atomization air pressure, and amount of liquid. For example, with a twin-fluid nozzle, the droplet becomes smaller as the atomization air pressure increases, and the droplet becomes larger as the liquid amount increases. The diameter of the droplet corresponds to the Sauter mean diameter measured by a laser measurement instrument.

When applying the coating agent, a coating subject (for example, transparent base material 11) has a surface temperature of, for example, 20° C. to 75° C., preferably 30° C. or greater, or, further preferably, 60° C. or greater. It is preferred that a hydronic heating device be used for heating the coating subject. The humidity when applying the coating agent is, for example, 20% to 80%, or preferably 50% or greater.

Preferably, a liquid flow rate, which is the amount of the coating agent discharged from the nozzle of a spray coating device, is 0.01 kg/hour to 1 kg/hour. When the liquid flow rate is decreased, the autocorrelation length (r0.2) can easily be decreased. When the liquid flow rate is increased, the mass productivity is increased.

The surface shape of the antiglare surface 12a of the transparent article 10 will now be described in detail.

The surface shape of the antiglare surface 12a is set based on autocorrelation function g(r) represented by equation (1).

$$g(r) = \frac{1}{2\pi} \int_0^{2\pi} d\phi \cdot g(r\cos\phi, r\sin\phi) \quad (1)$$

The autocorrelation function g(r) is obtained by converting autocorrelation function $g(t_x, t_y)$, which is normalized to a surface shape z(x, y) of the antiglare surface 12a, into polar coordinates ($t_x$=r cos Φ, $t_y$=r sin Φ) and performing averaging an angular direction. The surface shape z(x, y) is a surface shape expressed when coordinates in a direction parallel to the antiglare surface 12a are orthogonal coordinates (x, y), and the height of the antiglare surface 12a in a direction orthogonal to the antiglare surface 12a is "z". The autocorrelation function $g(t_x, t_y)$ is represented by equation (2). "A" in equations (2) and (3) is an area of a subject range (measurement area) of the antiglare surface 12a. The origin of the surface shape z(x, y) is a position that satisfies equation (3).

$$\left. \begin{array}{l} g(t_x, t_y) = G(t_x, t_y)/G(0, 0) \\ G(t_x, t_y) = \frac{1}{A} \int\!\!\int_A dxdy \cdot z(x, y)z(x - t_x, y - t_y) \end{array} \right\} \quad (2)$$

$$\int\!\!\int_A dxdy \cdot z(x, y) = 0 \quad (3)$$

The surface shape z(x, y) can be measured with a known roughness measurement apparatus. The autocorrelation function $g(t_x, t_y)$ can be directly calculated from the surface shape z(x, y).

The antiglare surface 12a has a surface shape such that a ratio ($r_0/r_{0.2}$) of autocorrelation length ($r_{0.2}$), which is the minimum value of distance r at which autocorrelation function g(r) represented by the above equation (1) is 0.2, to autocorrelation length ($r_0$), which is the minimum value of distance r at which the autocorrelation function g(r) is 0, is greater than or equal to 2.

Figure 2:
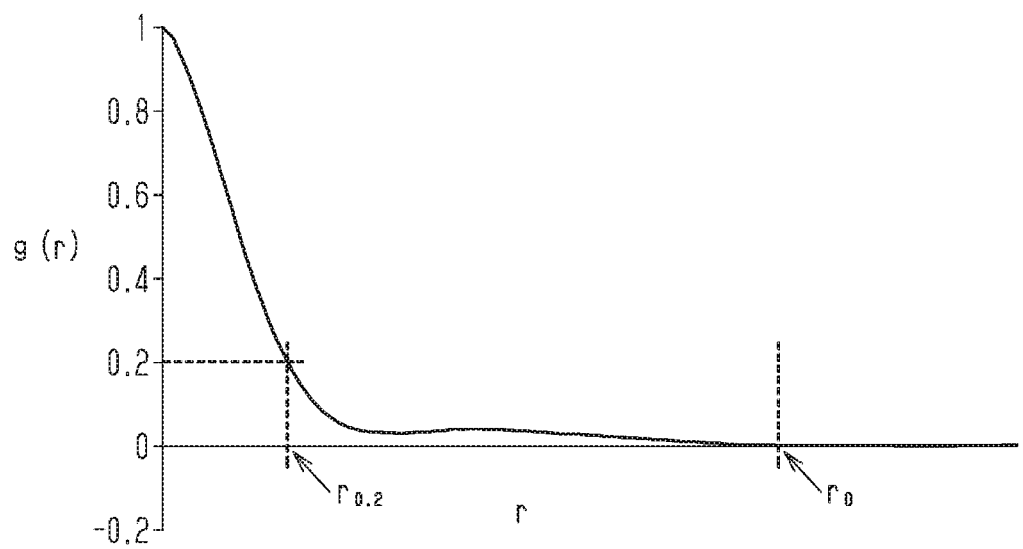
FIG. 2 is a graph illustrating changes in autocorrelation function g(r).

FIG. 2 is a graph illustrating changes in the autocorrelation function g(r) relative to the distance r to the origin of the surface shape z(x, y). As illustrated by the graph, the autocorrelation length ($r_0$) is the distance r at a point where the autocorrelation function g(r) first attenuates to 0.2, and the autocorrelation length ($r_0$) is the distance r at a point where the autocorrelation function g(r) first attenuates to 0. When the antiglare surface 12a has the surface shape such that the ratio ($r_0/r_{0.2}$) of the autocorrelation length ($r_{0.2}$) to the autocorrelation length ($r_0$) is greater than or equal to 2, a superior antireflection effect based on the surface shape of the antiglare surface 12a is obtained and the resolution of the display device is maintained. Preferably, the ratio ($r_0/r_{0.2}$) is greater than or equal to 4.

A large ratio ($r_0/r_{0.2}$) indicates that the surface shape of the antiglare surface 12a includes irregularities of various sizes in a non-uniform manner. Thus, when the antiglare surface 12a of the transparent article 10 has an irregular surface shape with irregularities of various sizes, it can be determined that light is efficiently diffused and reflected. As a result, the antireflection effect is enhanced while the resolution is maintained.

The autocorrelation length ($r_0$) is preferably 15 µm or greater and further preferably 19 µm or greater. This reduces the sparkle (glare resulting from a sparkle effect) on the antiglare surface 12a while efficiently reducing the reflection. Further, the autocorrelation length ($r_0$) may be an infinite value in calculation.

The autocorrelation length ($r_{0.2}$) is preferably 6 pin or less and further preferably 5 μm or less. This reduces the sparkle (glare resulting from a sparkle effect) on the antiglare surface 12a.

The autocorrelation function g(r), the autocorrelation length ($r_0$), and the autocorrelation length ($r_0$) can be controlled by changing a forming condition of the antiglare layer 12. For example, in a case where the antiglare layer 12 is formed by the spray coating process, when the diameter of the coating agent discharged from the nozzle is decreased, the ratio ($r_0/r_{0.2}$) is increased. When the surface temperature of the transparent base material 11 is increased, the ratio ($r_0/r_{0.2}$) is increased.

In particular, the antiglare surface having a surface shape such that the ratio ($r_0/r_{0.2}$) is greater than or equal to 2 is easily formed when the surface temperature of the transparent base material 11 is increased. The reasons for this are considered to be as follows. When droplets fall on the transparent base material 11, of which the surface temperature is increased, the droplets instantaneously decrease the surface temperature of the portion where the droplets fell. Thus, some droplets will fall on the portion where the surface temperature has been decreased by the droplets that fell slightly in advance. There will be a difference in size (height) between the irregularities formed by hardened droplets that fall on portions where the surface temperature has been decreased and the irregularities formed by hardened droplets that fall on portions where the surface temperature has not been decreased.

As a result, an irregular surface shape with irregularities of various sizes is formed such that the ratio ($r_0/r_{0.2}$) is greater than or equal to 2. Moreover, such effect is further outstandingly enhanced when a nozzle with a small diameter is used to decrease the diameter of the droplet. In a specific example, the antiglare layer 12 is formed by applying a coating agent to the transparent base material 11, of which the surface temperature has been heated to 30° C. or higher, using a twin-fluid nozzle with a diameter of 0.5 mm or less. The diameter of a nozzle refers to an average value of an inner diameter of a liquid discharge hole of the nozzle.

Further, when the amount of the coating agent applied is increased, the surface roughness Sa is increased. For example, the amount of the applied coating agent is preferably 1 to 100 g/m$^2$.

Figure 3:
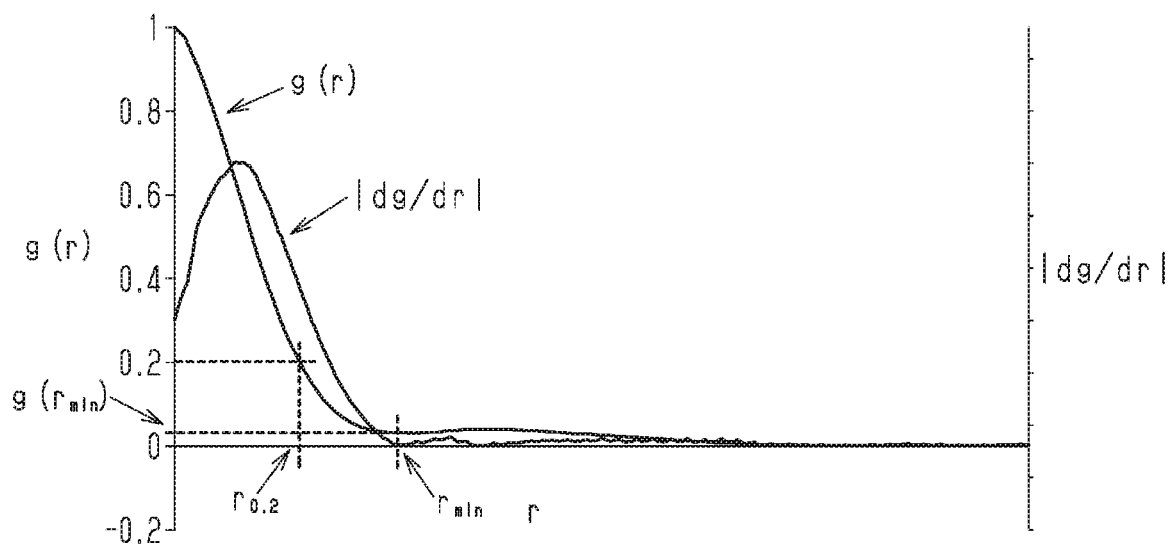
FIG. 3 is a graph illustrating changes in autocorrelation function g(r) and changes in absolute value (|dg/dr|) of a derivative of autocorrelation function g(r).

Further, FIG. 3 shows the graph of changes in the autocorrelation function g(r) overlapped with the graph of changes in absolute value (|dg/dr|) of a derivative of the autocorrelation function g(r). The graph of changes in absolute value (|dg/dr|) of a derivative of the autocorrelation function g(r) includes a local minimum value at which the change tendency in accordance with the increases in the distance r switches from decrease to increase. Here, when the minimum value of the distance r, which has the above local minimum value in a range in which the distance r is greater than the autocorrelation length ($r_{0.2}$), is autocorrelation length $r_{min}$, it is preferred that the antiglare surface 12a has a surface shape such that the autocorrelation function g($r_{min}$) is a positive value. This reduces the sparkle (glare resulting from a sparkle effect) on the antiglare surface 12a while efficiently reducing the reflection.

When calculating the autocorrelation length $r_{min}$, it is preferred that a smoothing process be performed with an appropriate smoothing filter on the graph illustrating changes in absolute value (|dg/dr|) of a derivative of the autocorrelation function g(r) to eliminate influences of noise. For example, a moving average filter or a Gaussian filter can be used as the smoothing filter. The autocorrelation length $r_{min}$ may be defined as the minimum value of distance r at which derivative (dg/dr) of the autocorrelation function g(r) is 0.

The transparent article 10 configured as described above is, for example, arranged and used on a display surface of a display device. In this case, the transparent article 10 may be a member mounted on the display surface of the display device. That is, the transparent article 10 may be retrofitted to the display device. Preferably, the transparent article 10 is applied to a display device having a pixel density of 160 to 600 ppi.

Preferably, the transparent article has a sparkle value, which will be described later, of 0.005 to 0.2. Further, it is preferred that the transparent article have a clarity value, which will be described later, of 2 to 10%, a haze value, which will be described later, of 0.1 to 11%, and the product of the clarity value and the haze value of 30 or less.

The operation and advantages of the present embodiment will now be described.

(1) The transparent article 10 includes the transparent base material 11 having the antiglare surface 12a. The antiglare surface 12a has a surface shape such that the ratio ($r_0/r_{0.2}$) of the autocorrelation length ($r_{0.2}$), which is the distance at which the autocorrelation function g(r) is 0.2, to the autocorrelation length ($r_0$), which is the distance at which the autocorrelation function g(r) is 0, is greater than or equal to 2.

With the above structure, the transparent article 10 obtains a superior antireflection effect based on the surface shape of the antiglare surface 12a while maintaining the resolution.

(2) Preferably, the antiglare surface 12a has a surface shape such that the autocorrelation length ($r_{0.2}$) is 6 min or less.

With the above structure, the transparent article reduces the sparkle on the antiglare surface 12a.

(3) Preferably, the antiglare surface 12a has a surface shape such that when the distance r, of which the local minimum value is first obtained in a range greater than the autocorrelation length ($r_{0.2}$), is $r_{min}$ in a graph illustrating changes in the absolute value (|dg/dr|) of the derivative of the autocorrelation function g(r), the autocorrelation function g($r_{min}$) is a positive value.

With the above structure, the transparent article reduces the sparkle on the antiglare surface 12a.

(4) The antiglare surface 12a is formed by the antiglare layer 12 including, for example, at least one selected from $SiO_2$, $Al_2O_3$, $ZrO_2$, and $TiO_2$.

The above structure further ensures advantages (1) to (3).

The present embodiment may be modified as described below.

The transparent article 10 may include an additional layer such as an antireflection layer and/or an antifouling layer besides the transparent base material 11 and the antiglare layer 12.

The antiglare surface 12a is not limited to the surface of the antiglare layer 12 arranged on one main surface of the transparent base material 11. For example, the antiglare surface 12a may be an antiglare surface having an uneven structure formed in the antiglare surface forming step using a different processing method such as blasting or etching performed on the surface of the transparent base material 11.

The antiglare surface 12a may be arranged on two or more surfaces of the transparent base material 11.

The ratio ($r_0/r_{0.2}$) of the autocorrelation length ($r_{0.2}$), which is the distance at which the autocorrelation function g(r) is 0.2, to the autocorrelation length ($r_0$), which is the distance at which the autocorrelation function g(r) is 0, may be used as an evaluation reference for the shape of the antiglare surface 12a of the transparent article 10.

Technical concepts that can be understood from the above embodiment and the modified examples will now be described.

(1) A transparent article comprising a transparent base material having an antiglare surface, wherein the antiglare surface has a surface shape such that when distance r, of which the local minimum value is first obtained in a range greater than the autocorrelation length ($r_{0.2}$), is $r_{min}$ in a graph illustrating changes in absolute value (|dg/dr|) of a derivative of autocorrelation function g(r) represented by the above equation (1), the autocorrelation function $g(r_{min})$ is a positive value.

(2) A transparent article comprising a transparent base material having an antiglare surface, wherein the antiglare surface has a surface shape such that autocorrelation length ($r_0$) is greater than or equal to 15, which is the minimum value of distance r at which autocorrelation function g(r) represented by the above equation (1) is 0.

(3) A method for evaluating a transparent article includes a transparent base material having an antiglare surface, the method comprising evaluating the transparent article based on whether the antiglare surface has a surface shape such that a ratio ($r_0/r_{0.2}$) of autocorrelation length ($r_{0.2}$), which is the minimum value of distance r at which autocorrelation function g(r) represented by the above equation (1) is 0.2, to autocorrelation length ($r_0$), which is the minimum value of distance r at which the autocorrelation function g(r) is 0, is greater than or equal to 2.

EXAMPLES

The above embodiment will now be described in further detail with reference to experimental examples. The present invention is not limited to these experimental examples.

Experimental Examples 1 to 12

Experimental examples 1 to 12 of the transparent article, each of which includes a transparent base material having an antiglare surface, were produced, each transparent article having a different surface shape of the antiglare surface. Specifically, the antiglare layer was formed by applying a coating agent using a spray coating apparatus to one surface of the transparent base material, which was formed from a chemically reinforced glass panel having a thickness of 1.3 mm (T2X-1, manufactured by Nippon Electric Glass Co., Ltd.). The spray coating apparatus had a twin-fluid nozzle. The coating agent was a solution prepared by dissolving a precursor of the anti-glare layer (tetraethyl orthosilicate) in a liquid medium including water. The coating agent was applied under an atmospheric humidity of 52% to the transparent base material, of which the surface temperature was adjusted to a predetermined temperature, and then heated at 180° C. for thirty minutes to dry. As shown in Table 1, the surface shapes of the antiglare surface of the transparent article of experimental examples 1 to 12 were varied by changing the nozzle diameter, the atomization air pressure when injecting the coating agent, the liquid flow rate which is a flow rate of the coating agent discharged from the nozzle, the amount of the coating agent applied per unit area, and/or the surface temperature of the transparent base material when forming the antiglare layer.

TABLE 1

| | Experimental Example 1 | Experimental Example 2 | Experimental Example 3 | Experimental Example 4 | Experimental Example 5 | Experimental Example 6 |
|---|---|---|---|---|---|---|
| Nozzle Diameter (mm) | 0.4 | 0.6 | 0.4 | 0.6 | 0.4 | 0.6 |
| Atomization Air Pressure (MPa) | 0.4 | 0.2 | 0.4 | 0.2 | 0.4 | 0.2 |
| Liquid Flow Rate (kg/hour) | 0.3 | 0.3 | 0.3 | 0.3 | 0.3 | 0.3 |
| Amount of Coating(g/m$^2$) | 31.3 | 31.3 | 31.3 | 52.1 | 62.5 | 72.9 |
| Surface Temperature (° C.) | 20 | 20 | 71 | 70 | 71 | 70 |

| | Experimental Example 7 | Experimental Example 8 | Experimental Example 9 | Experimental Example 10 | Experimental Example 11 | Experimental Example 12 |
|---|---|---|---|---|---|---|
| Nozzle Diameter (mm) | 0.4 | 0.6 | 0.4 | 0.4 | 0.8 | 0.4 |
| Atomization Air Pressure (MPa) | 0.4 | 0.2 | 0.4 | 0.4 | 0.2 | 0.4 |
| Liquid Flow Rate (kg/hour) | 0.3 | 0.3 | 0.4 | 0.4 | 0.3 | 0.2 |
| Amount of Coating(g/m$^2$) | 52.1 | 41.7 | 19.1 | 38.3 | 47.5 | 20.8 |
| Surface Temperature (° C.) | 71 | 20 | 69 | 69 | 20 | 71 |

Analysis of Surface Shape of Antiglare Surface

The shape z(x, y) of the antiglare surface on the transparent article of each experimental example was measured using a scanning white-light interference microscope (VertScan manufactured by Ryoka Systems Inc.). The surface roughness Sa was measured in accordance with ISO 25178. The measurement was performed over a measurement area of 316.77 μm×237.72 μm in WAVE mode using a 530 white filter and an objective lens with a magnifying power of 20 times at a resolution of 640 pixels×480 pixels. The measured data underwent a primary surface correction using analysis software VS-Viewer to obtain the shape z(x, y) of the antiglare surface and the surface roughness Sa. The autocorrelation function g(r) calculated "radial ACF" relative to the shape z(x, y) of the antiglare surface with analysis software gwyddion 2.46 to obtain the autocorrelation length ($r_{0.2}$), the autocorrelation length ($r_0$), and the ratio ($r_0/r_{0.2}$). The results are shown in Table 2.

Further, the absolute value (|dg/dr|) of the derivative of the autocorrelation function g(r) was calculated from the autocorrelation function g(r). Next, the autocorrelation length ($r_{min}$) and the autocorrelation function $g(r_{min})$ were obtained from the absolute value (|dg/dr|) of the derivative of the autocorrelation function g(r). The results are shown in Table 2. When calculating the autocorrelation length ($r_{min}$), a smoothing process was performed with a moving average filter having sections of 0.5 μm on the graph illustrating changes in the absolute value of the derivative of the autocorrelation function to eliminate influences of noise.

Figure 7:
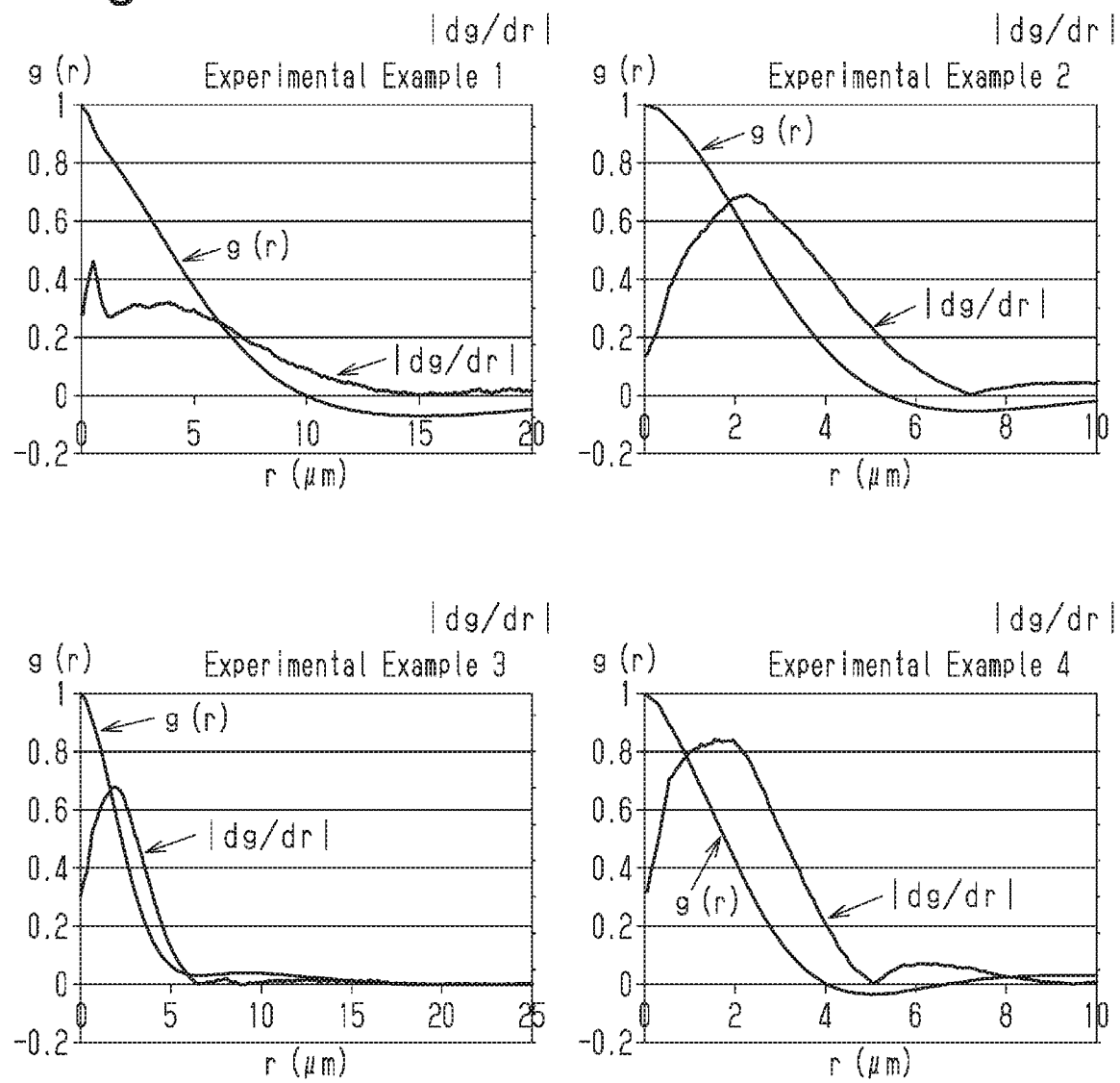
FIG. 7 is a graph illustrating changes in autocorrelation function g(r) and changes in absolute value (|dg/dr|) of the derivative of autocorrelation function g(r) of experimental examples 1 to 4.
Figure 8:
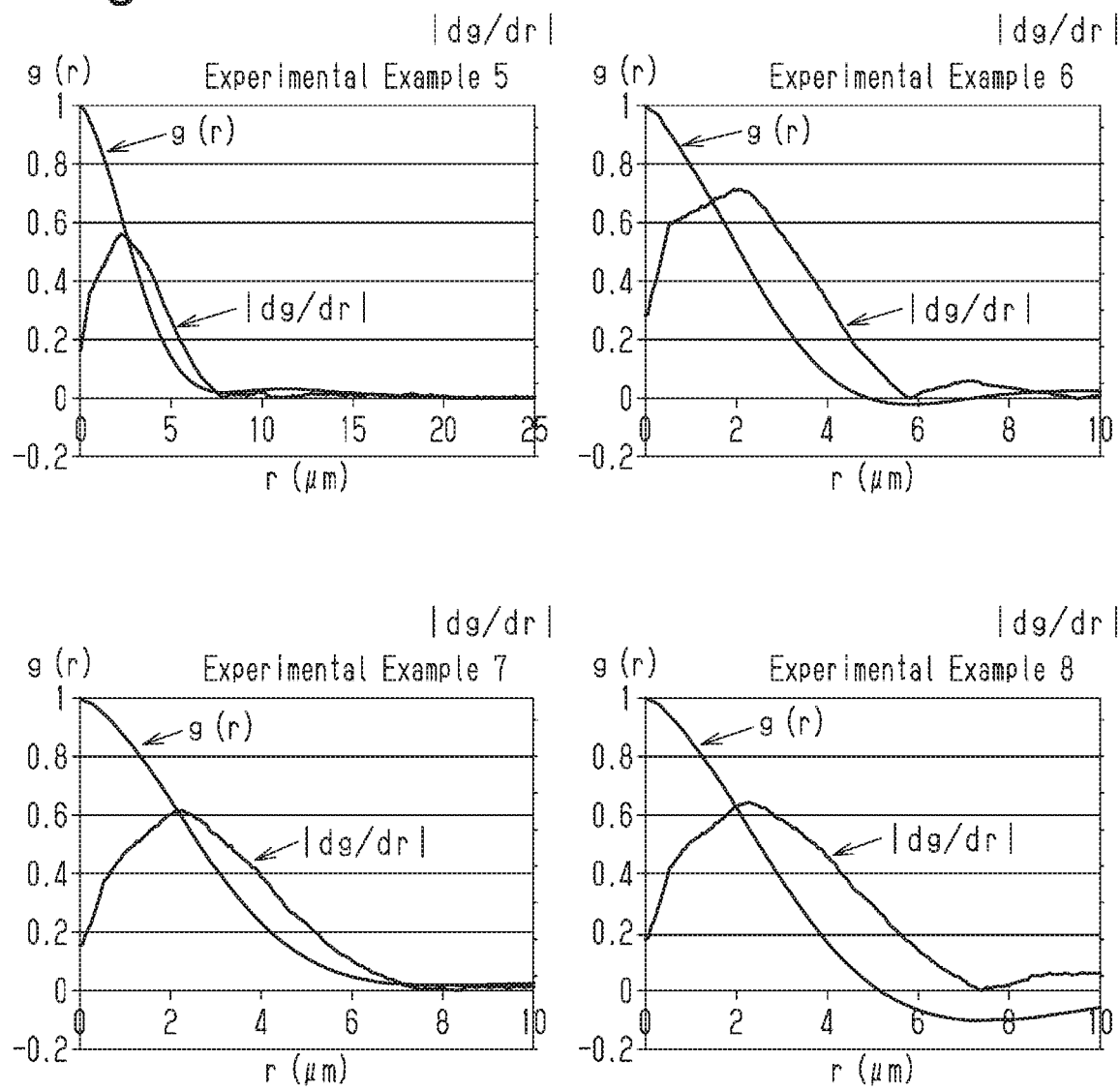
FIG. 8 is a graph illustrating changes in autocorrelation function g(r) and changes in absolute value (|dg/dr|) of the derivative of autocorrelation function g(r) of experimental examples 5 to 8.
Figure 9:
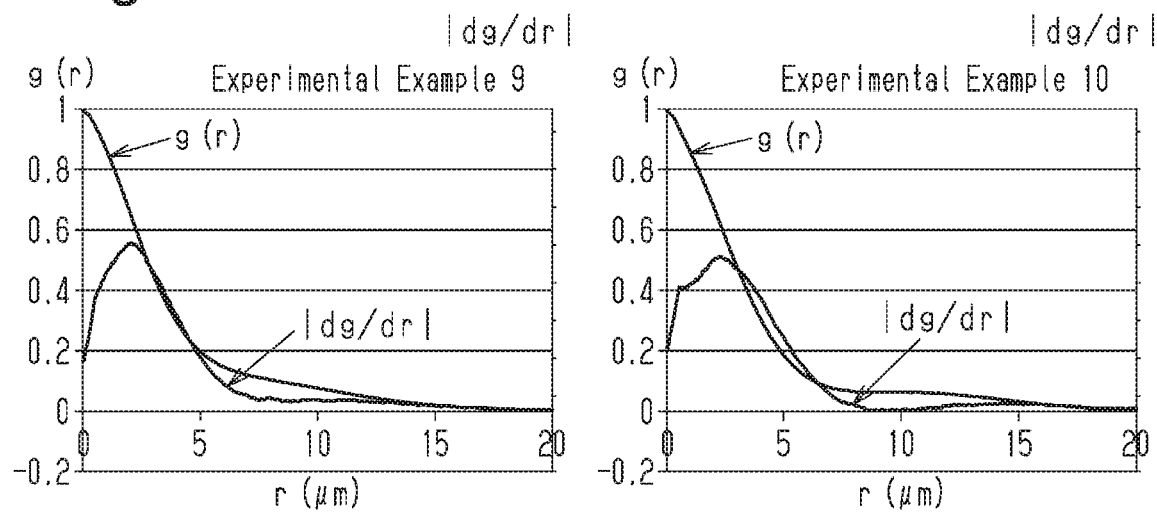
FIG. 9 is a graph illustrating changes in autocorrelation function g(r) and changes in absolute value (|dg/dr|) of the derivative of autocorrelation function g(r) of experimental examples 9 to 12.
Figure 9:
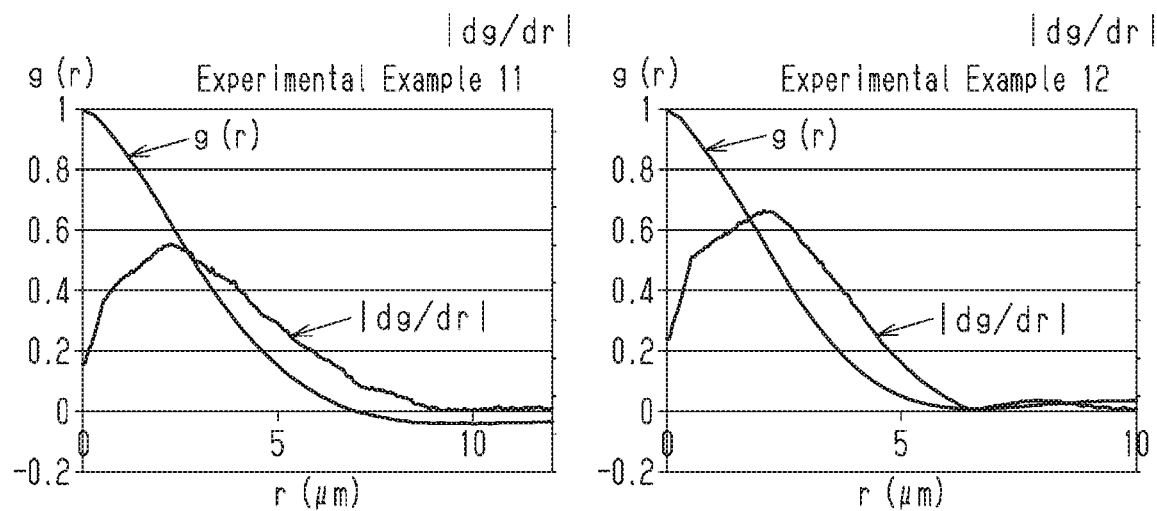

FIGS. 7 to 9 show graphs of changes in the autocorrelation function g(r) in experimental examples overlapped with the graphs of changes in absolute value (|dg/dr|) of a derivative of the autocorrelation function g(r).

Measurement of Clarity Value

The clarity value of the antiglare surface on the transparent article of each experimental example was measured. The results are shown in Table 2. The clarity value is a value of a ratio of a brightness of a specular reflection component to a brightness of a total refection light obtained from brightness distribution data of an image, which is a reflection of a light source on the antiglare surface of the transparent article.

The clarity value is a value that indicates reflection on the antiglare surface and decreases as the reflection on the antiglare surface is reduced. The use of clarity value allows for a quantitative evaluation of reflection that is close to human visual image recognition. The specific measurement method of the clarity value will now be described.

Figure 4:
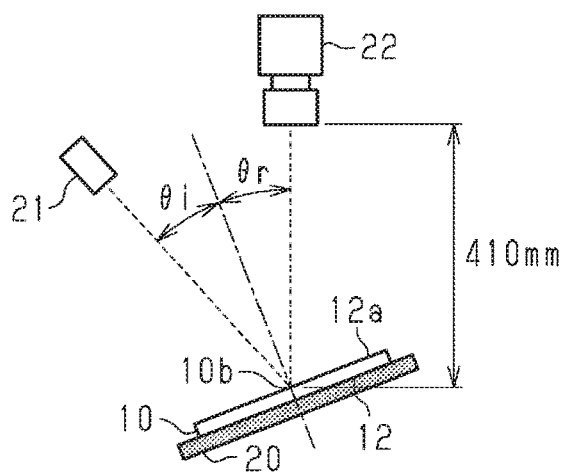
FIG. 4 is a diagram illustrating the measurement of a clarity value.

As shown in FIG. 4, the transparent article 10 was placed on a black glass plate 20, the black glass plate having a thickness of 5 mm or greater, with the antiglare surface 12a located at an upper side. Further, a linear light source 21 and a light detector 22 were each arranged at positions opposing the antiglare surface 12a of the transparent article 10. The light detector 22 included a lens having a focal range of 16 mm. The linear light source 21 was located at a position inclined at a first angle $\theta i$ (=3°) toward one side (negative direction) from a direction parallel to a thickness-wise direction of the transparent article 10 (direction orthogonal to antiglare surface 12a).

The light detector 22 was located at a position inclined at a second angle $\theta r$ toward the other side (positive direction) from the direction parallel to the thickness-wise direction of the transparent article 10 so that the lens was located at a position separated by 410 mm from the antiglare surface 12a. The linear light source 21 and the light detector 22 were arranged in the same plane, which was orthogonal to the antiglare surface 12a of the transparent article 10. The light detector 22 that was used was an SMS-1000 (manufactured by Display-Messtechnik & Systeme).

Subsequently, light was emitted from the linear light source 21 toward the antiglare surface 12a of the transparent article 10. Then, the light detector 22 obtains image data of the antiglare surface 12a of the transparent article 10 and analyzes the image data with the SMS-1000 in a reflection distribution measurement mode (software "Sparkle measurement system") to measure the brightness distribution data of the image reflected on the antiglare surface 12a in a range of $-5° \leq \theta^*(=\theta r-\theta i) \leq 5°$. The clarity value was calculated from the following equation (4) based on the brightness of total refection light and the brightness of specular reflection component obtained from the measured brightness distribution data. The brightness of specular reflection component refers to a brightness in a range of a half width of the peak brightness.

clarity value (%)=[brightness of specular reflection component]/[brightness of total refection light]×100 (4)

Measurement of Haze Value

The haze value of the transparent article 10 of each experimental examples 1 to 12 was measured in accordance with JIS K7136 (2000). The results are shown in the column of "Haze Value" in Table 2. JIS K7136 (2000) corresponds to ISO 14782 and is directed to the same technical content. The haze value is a value that indicates the degree of decreases in the resolution, which can be lowered when the haze value on the antiglare surface is lower.

Measurement of the Sparkle Value

The sparkle value of the antiglare surface on the transparent article of each experimental example was measured. The results are shown in Table 2. The sparkle value is a value obtained by arranging a planar light source at a position opposing the surface opposite to the antiglare surface of the transparent article, arranging a pattern mask between the transparent article and the planar light source, capturing an image of the transparent article from a position opposing the antiglare surface so that the antiglare surface of the transparent article and a top surface of the pattern mask are included in a forward depth of field having a permissible circle of confusion diameter of 53 µm, calculating an average value and a standard deviation of a pixel brightness of the pattern mask by analyzing the image data obtained by capturing an image, and dividing the standard deviation by the average value.

The sparkle value is a value that indicates the degree of sparkle on the antiglare surface and decreases as the sparkle on the antiglare surface is reduced. The use of the sparkle value allows for a quantitative evaluation of the sparkle that is close to human visual image recognition. The specific measurement method of the sparkle value will now be described.

Figure 5:
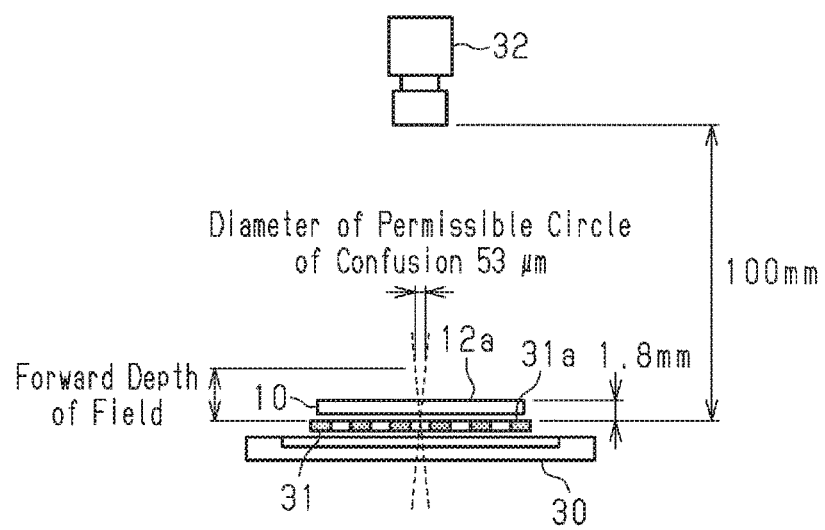
FIG. 5 is a diagram illustrating the measurement method of a sparkle value.

As shown in FIG. 5, a pattern mask 31 was placed on a planar light source 30, and the transparent article 10 was placed on the pattern mask 31 so that the surface opposite to the antiglare surface 12a was faced toward the pattern mask 31. In addition, a light detector 32 was disposed at a position opposing the antiglare surface 12a of the transparent article 10. The light detector 32 was set to have a permissible circle of confusion with a diameter of 53 µm.

Figure 6:
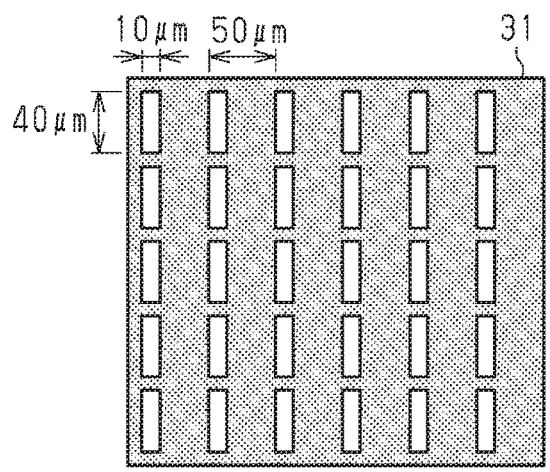
FIG. 6 is an explanatory diagram of a pattern mask.

As shown in FIG. 6, the pattern mask 31 was a 500 ppi pattern mask having a pixel size of 10 µm×40 µm and a pitch of 50 µm. The light detector 32 that was used was SMS-1000 (manufactured by Display-Messtechnik & Systeme).

The light detector 32 had a sensor size of ⅓ type and a pixel size of 3.75 µm×3.75 µm. The focal range of the light detector 32 was set to of 100 mm, and the lens aperture diameter was set to 4.5 mm. The pattern mask 31 was arranged so that a top surface 31a was located at the focal position of the light detector 32, and the transparent article 10 was arranged so that the distance between the top surface 31a of the pattern mask 31 and the antiglare surface 12a was 1.8 mm.

Then, in a state in which the planar light source 30 emitted light toward the antiglare surface 12a of the transparent article 10 through the pattern mask 31, the light detector 32 captured an image of the antiglare surface 12a of the transparent article 10 to obtain image data. The obtained image data was analyzed with the SMS-1000 in the sparkle measurement mode (software "Sparkle measurement system") to calculate the pixel brightness of each pixel, the standard deviation of the pixel brightness between pixels, and the average value of the pixel brightness of the pattern mask 31. Based on the obtained standard deviation between pixels and the average value of the pixel brightness, the sparkle value was calculated from the following equation (5).

sparkle value=[standard deviation of pixel brightness of pattern mask]/[average value of pixel brightness of pattern mask] (5)

TABLE 2

|  |  | Experimental Example 1 | Experimental Example 2 | Experimental Example 3 | Experimental Example 4 | Experimental Example 5 | Experimental Example 6 |
|---|---|---|---|---|---|---|---|
| Surface Shape | Surface Roughness Sa (μm) | 0.096 | 0.060 | 0.059 | 0.060 | 0.087 | 0.106 |
|  | Auto-correlation $r_{0.2}$ | 6.64 | 3.74 | 3.68 | 2.79 | 4.51 | 3.26 |
|  | Length (μm) $r_0$ | 9.96 | 5.40 | 21.35 | 4.03 | 19.33 | 4.98 |
|  | $r_{min}$ | 14.88 | 7.20 | 6.55 | 5.07 | 7.85 | 5.84 |
|  | $r_0/r_{0.2}$ | 1.50 | 1.44 | 5.80 | 1.44 | 4.28 | 1.53 |
|  | $g(r_{min})$ | −0.0723 | −0.0542 | +0.0308 | −0.0328 | +0.0142 | −00201 |
| Characteristics | Clarity Value (%) | 7.4 | 5.4 | 3.5 | 5.4 | 2.8 | 2.4 |
|  | Haze Value (%) | 4.69 | 6.22 | 6.88 | 9.17 | 9.87 | 15.98 |
|  | Clarity Value × Haze Value | 34.7 | 33.6 | 24.1 | 49.5 | 27.6 | 38.4 |
|  | Sparkle Value | 0.026 | 0.009 | 0.012 | 0.009 | 0.017 | 0.015 |

|  |  | Experimental Example 7 | Experimental Example 8 | Experimental Example 9 | Experimental Example 10 | Experimental Example 11 | Experimental Example 12 |
|---|---|---|---|---|---|---|---|
| Surface Shape | Surface Roughness Sa (μm) | 0.072 | 0.111 | 0.052 | 0.087 | 0.092 | 0.077 |
|  | Autocorrelation $r_{0.2}$ | 4.21 | 3.83 | 4.98 | 4.80 | 4.57 | 3.68 |
|  | Length (μm) $r_0$ | 21.61 | 5.19 | 37.07 | 28.88 | 6.94 | 21.11 |
|  | $r_{min}$ | 8.24 | 7.38 | 7.29 | 8.48 | 9.73 | 6.52 |
|  | $r_0/r_{0.2}$ | 5.13 | 1.36 | 7.44 | 6.02 | 1.52 | 5.74 |
|  | $g(r_{min})$ | +0.0178 | −0.101 | +0.1143 | +0.0611 | −0.0412 | +0.0072 |
| Characteristics | Clarity Value (%) | 3.1 | 3.3 | 4.8 | 2.4 | 3.8 | 2.4 |
|  | Haze Value (%) | 8.76 | 13.98 | 5.48 | 10.93 | 9.57 | 9.64 |
|  | Clarity Value × Haze Value | 27.2 | 46.1 | 26.3 | 26.2 | 36.4 | 23.1 |
|  | Sparkle Value | 0.015 | 0.016 | 0.015 | 0.018 | 0.015 | 0.013 |

As shown in Table 2, the products of the clarity value and the haze value in experimental examples 3, 5, 7, 9, 10, and 12 were lower (value lower than or equal to 30) than in experimental examples 1, 2, 4, 6, 8, and 11. When comparing the surface shape of the antiglare surface of experimental examples 3, 5, 7, 9, 10, and 12 with that of experimental examples 1, 2, 4, 6, 8, and 11, there is a large difference in the ratio ($r_0/r_{0.2}$) of the autocorrelation length. Experimental examples 3, 5, 7, 9, 10, and 12 had an outstandingly high value of the ratio ($r_0/r_{0.2}$) of the autocorrelation length. The results indicate that when the antiglare surface has a surface shape such that the ratio ($r_0/r_{0.2}$) of the autocorrelation length is high (2 or greater), the transparent article obtains a superior antireflection effect and maintains the resolution.

As shown in Table 2, experimental example 1 had a sparkle value of 0.026, which is higher than experimental examples 2 to 12. When the surface shape of the antiglare surface of experimental example 1 is compared to that of experimental examples 2 to 12, there is a large difference in the autocorrelation length ($r_{0.2}$). The autocorrelation length ($r_{0.2}$) of experimental example 1 was outstandingly high. The results indicate that when the antiglare surface has a surface shape such that the autocorrelation length ($r_{0.2}$) is a low value (6 μm or less), the transparent article reduces the sparkle on the antiglare surface.

Experimental examples 3, 5, 7, 9, 10, and 12 obtained a superior antireflection effect, maintained the resolution, and reduced the sparkle on the antiglare surface. Experimental examples 3, 5, 7, 9, 10, and 12 also had the autocorrelation function $g(r_{min})$ of a positive value. In contrast, experimental examples 1, 2, 4, 6, 8, and 11 had the autocorrelation function $g(r_{min})$ that was less than or equal to 0.

DESCRIPTION OF THE REFERENCE NUMERALS 10) transparent article, 11) transparent base material, 12) antiglare layer, 12a) antiglare surface.

The invention claimed is:

1. A transparent article arranged on a display surface of a display device, the transparent article comprising a transparent base material having an antiglare surface, wherein the antiglare surface has a surface shape such that a ratio ($r_0/r_{0.2}$) of autocorrelation length ($r_{0.2}$), which is the minimum value of distance r at which autocorrelation function g(r) represented by equation (1) is 0.2, to autocorrelation length ($r_0$), which is the minimum value of distance r at which the autocorrelation function g(r) is 0, is greater than or equal to 2, $$g(r) = \frac{1}{2\pi} \int_0^{2\pi} d\phi \cdot g(r\cos\phi, r\sin\phi) \quad (1)$$

whereas, the autocorrelation function g(r) is obtained by converting autocorrelation function $g(t_x, t_y)$, which is normalized to a surface shape z(x, y) of the antiglare surface, into polar coordinates ($t_x$=r cos Φ, $t_y$=r sin Φ) and performing averaging in an angular direction, the surface shape z(x, y) is a surface shape expressed when coordinates in a direction parallel to the antiglare surface are orthogonal coordinates (x, y) and the height of the antiglare surface in a direction orthogonal to the antiglare surface is "z", the autocorrelation function $g(t_x, t_y)$ is represented by equation (2), "A" in equations (2) and (3) is an area of a subject range of the antiglare surface, and the origin of the surface shape z(x, y) is a position that satisfies equation (3).

$$\left.\begin{array}{l} g(t_x, t_y) = G(t_x, t_y)/G(0, 0) \\ G(t_x, t_y) = \frac{1}{A} \int\int_A dxdy \cdot z(x, y)z(x - t_x, y - t_y) \end{array}\right\} \quad (2)$$

$$\int\int_A dxdy \cdot z(x, y) = 0 \quad (3)$$

2. The transparent article according to claim 1, wherein the surface shape of the antiglare surface is such that the autocorrelation length ($r_{0.2}$) is 6 μm or less.

3. The transparent article according to claim 1, wherein the surface shape of the antiglare surface is such that when distance r, of which the local minimum value is first obtained in a range greater than the autocorrelation length ($r_{0.2}$), is $r_{min}$ in a graph illustrating changes in absolute value ($|dg/dr|$) of a derivative of the autocorrelation function $g(r)$, the autocorrelation function $g(r_{min})$ is a positive value.

4. A method for manufacturing the transparent article according to claim 1, comprising:
- forming an antiglare layer including the antiglare surface by applying a coating agent on a surface of the transparent base material through a spray coating process, wherein
- said forming an antiglare layer includes using a twin-fluid nozzle with a diameter of 0.5 mm or less and setting a surface temperature of the transparent base material to 30° C. or higher.

5. The transparent article according to claim 1, wherein the transparent article comprises a member mounted on the display surface of the display device.

* * * * *